US009261918B2

(12) United States Patent
Franz et al.

(10) Patent No.: US 9,261,918 B2
(45) Date of Patent: Feb. 16, 2016

(54) INFORMATION HANDLING SYSTEM HINGE SUPPORT FRAME

(71) Applicant: Dell Products L.P., Round Rock, TX (US)

(72) Inventors: Jason T. Franz, Austin, TX (US); Charles D. Hood, III, Cedar Park, TX (US); Deeder M. Aurongzeb, Austin, TX (US); Chiu-Jung Tsen, Hsinchu (TW)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 14/263,127

(22) Filed: Apr. 28, 2014

(65) Prior Publication Data
US 2015/0309540 A1    Oct. 29, 2015

(51) Int. Cl.
*G06F 1/16* (2006.01)
*E05D 3/12* (2006.01)
*E05D 7/00* (2006.01)

(52) U.S. Cl.
CPC .............. *G06F 1/1681* (2013.01); *E05D 3/12* (2013.01); *E05D 7/00* (2013.01); *G06F 1/1618* (2013.01)

(58) Field of Classification Search
USPC ......... 206/250, 264, 242, 225, 525, 480, 138, 206/528, 376, 484; 455/575.5, 558, 575.1, 455/575.3, 500; 16/354, 366, 96 R, 327, 16/337, 321, 334, 319, 341, 320, 374, 412, 16/408, 386; 345/168, 1.3, 697, 174; 361/679.27, 679.09, 679.54, 679.48, 361/679.55, 679.21, 679.33, 679.11, 361/679.19, 679.26, 679.31, 679.47, 679.02
See application file for complete search history.

(56) References Cited

U.S. PATENT DOCUMENTS

2015/0138710 A1*   5/2015   Mathew et al. .......... 361/679.26
2015/0205331 A1*   7/2015   McClintock et al. ..... 361/679.12

* cited by examiner

*Primary Examiner* — Hung Duong
(74) *Attorney, Agent, or Firm* — Terrile, Cannatti, Chambers & Holland, LLP; Robert W. Holland

(57) ABSTRACT

Low profile portable information handling systems rotationally couple a lid and chassis portion with a dual axis hinge that couples at one axis with an extension and countersink engagement to enhance system strength. For example, a conical boss in a lid support frame extends into a countersink formed in a hinge axis and includes threads to accept a screw inserted from the hinge axis into the conical boss. The conical boss inner diameter extends the space available for placement of threads to engage a screw to provide enhanced coupling strength between the hinge axis and lid support frame.

20 Claims, 8 Drawing Sheets

INFORMATION HANDLING SYSTEM HINGE SUPPORT FRAME

BACKGROUND OF THE INVENTION

1. Field of the Invention

The present invention relates in general to the field of information handling system housings, and more particularly to a rotationally coupled information handling system housing hinge support frame.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. In more recently deployed convertible configurations, portable information handling systems include a touchscreen display in a lid having rotation between a closed position and a tablet position in which the lid holds the display exposed and proximate the main chassis portion. For example, one convertible option is to rotate the lid from the closed position for 360 degrees about the main chassis portion so that the display is exposed like a tablet and resting against the bottom surface of the main chassis portion. Another option is to rotate the lid from a closed position for 90 degrees about a horizontal axis to a conventional clamshell open position, then rotate the lid or the display 180 degrees about a vertical axis so that the lid then rotates to the closed position with the display facing outward.

End users generally desire portable information handling systems that have as much processing power and battery life as is possible in as little of a housing space as is possible. Low profile portable information handling systems tend to have minimal structural support so that weight and physical dimensions are kept small. A difficulty with such low profile systems is that bezels and lid structures for holding the display tend to have torsion and additional flexure infliction points around the hinge area during opening and closing of the lid relative to the chassis. Hinge cycle testing with required repetitions of 20,000 rotations or more too often result in failure at the hinge mount due to loss of alignment gradually induced on existing hinge mounts over time. Obtaining reliable hinge structures that are inexpensive and that fit into existing manufacturing norms with acceptable yield presents a challenge with low profile information handling systems. For example, the assembly of hinges to lid and chassis structures with screws becomes difficult since the small size of the hinges and the supporting structures minimizes the available space for placing threads that the screws can engage. Minimal screw-to-thread engagement reduces the fastening strength, and reduces the structural integrity to counter torsional forces.

SUMMARY OF THE INVENTION

Therefore a need has arisen for a system and method which provides a robust hinge support frame structure to rotationally couple an information handling system lid and chassis to each other.

In accordance with the present invention, a system and method are provided which substantially reduce the disadvantages and problems associated with previous methods and systems for rotationally coupling an information handling system lid and chassis to each other. A support surface couples to a hinge with an extension from the support surface into an opening of the hinge. The extension surface provides room for a securing device having length of greater than the supporting surfaces thickness to more securely couple the hinge to the supporting surface.

More specifically, an information handling system includes processing components disposed in a housing having a chassis rotationally coupled to a lid by one or more hinges, such as dual axis hinges that provide 360 degrees of rotation of the lid relative to the chassis. The hinge couples to the chassis at a chassis support surface, and couples to the lid at a lid support surface. The lid and chassis support surfaces include one or more openings to accept a couple device, such as a screw. The opening includes a conical boss that extends outward from the support surface towards the hinge. The conical boss aligns with an opening in the hinge, such as an opening having a countersink to accept the conical boss. The inner surface of the support surface opening and the conical boss includes threads to engage the screw so that the length of threads available to engage the screw is greater than the thickness of the support surface. The screw is inserted from the hinge opening into the conical boss to engage the threads and couple the hinge to the support surface.

The present invention provides a number of important technical advantages. One example of an important technical advantage is that a low profile information handling system chassis and lid are rotationally coupled to each other in a robust manner that endures repeated rotation cycles and is consistent with conventional assembly techniques. The extra thread length provided by the conical boss extension of the support surface into the countersink of the hinge provides a more secure connection by a screw and reduces the risk of screw disengagement from support surface threads. The conical boss aids alignment of the hinge into the proper position on the support surface to reduce manufacturing complexity and adapts to varying heights and screw lengths for systems of different profile heights.

BRIEF DESCRIPTION OF THE DRAWINGS

The present invention may be better understood, and its numerous objects, features and advantages made apparent to FIG. 1 depicts a blow-up view of a convertible portable information handling system.

DETAILED DESCRIPTION

An extension from an information handling system support surface into a hinge improves hinge coupling security in low profile convertible information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
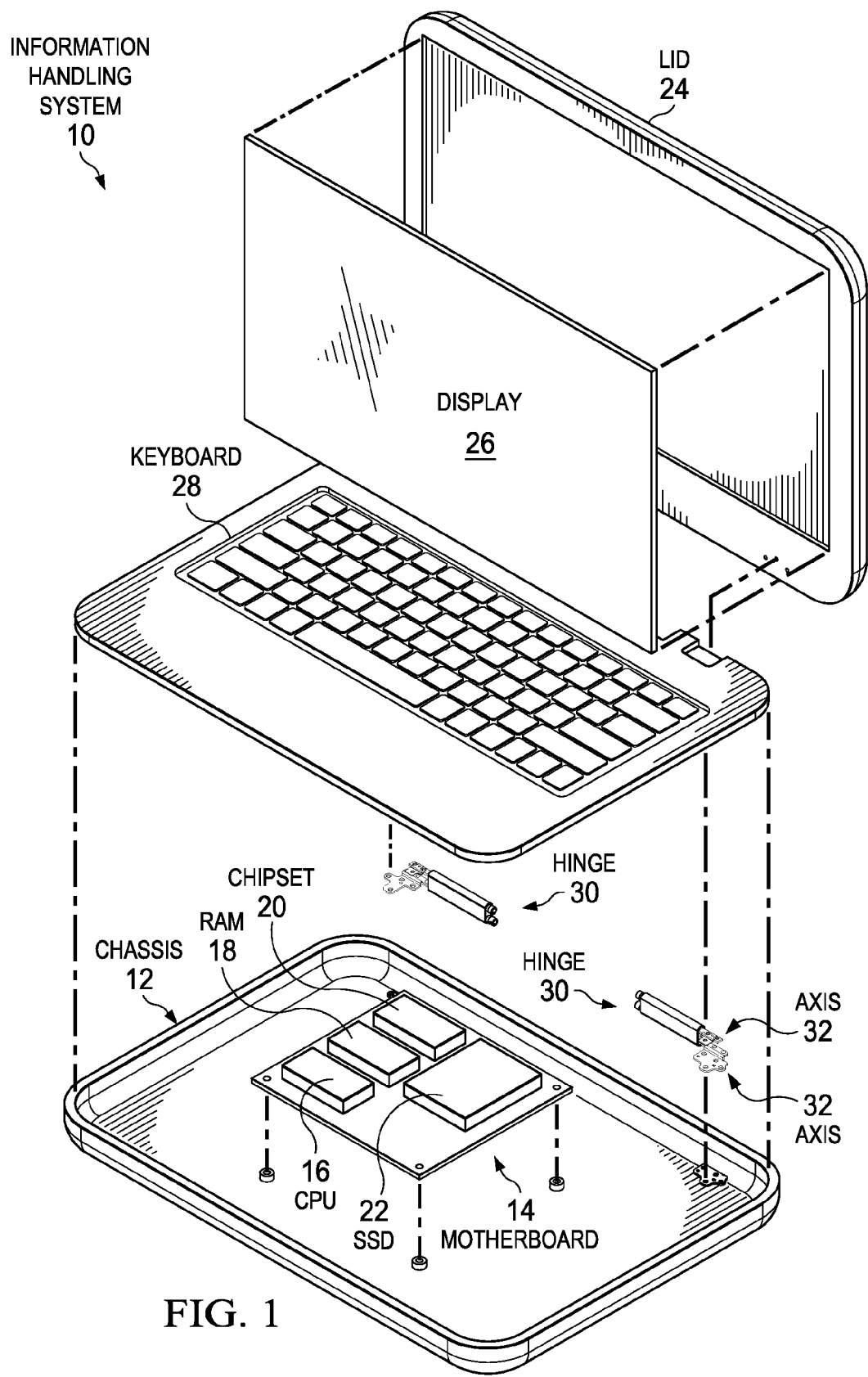

Referring now to FIG. 1, a blow-up view depicts a convertible portable information handling system 10. Information handling system 10 processes information with a variety of processing components disposed in a chassis portion 12. In the example embodiment, a motherboard 14 held in chassis 12 supports a central processing unit (CPU) 16, random access memory (RAM) 18, a chipset 20 and a solid state drive (SSD) 22 that cooperate to execute instructions that process information. A lid portion 24 holds a display 26 that presents information as visual images, such as information provided by a graphics processor disposed in chipset 20. A keyboard 28 assembles over motherboard 14 in chassis 12 to provide an integrated input device for an end user to interact with the processing components. Lid 24 is rotationally coupled with chassis 12 by a pair of hinges 30. In the example embodiment, hinges 30 are dual axis hinges that each include first and second axis 32. Dual axis hinges 30 allow 360 degrees of rotation of lid 24 about chassis 12 so that information handling system 10 converts between closed and tablet positions. In alternative embodiments, other types of rotational relationships may be used to move lid 24 and chassis 12 relative to each other.

Figure 2A:
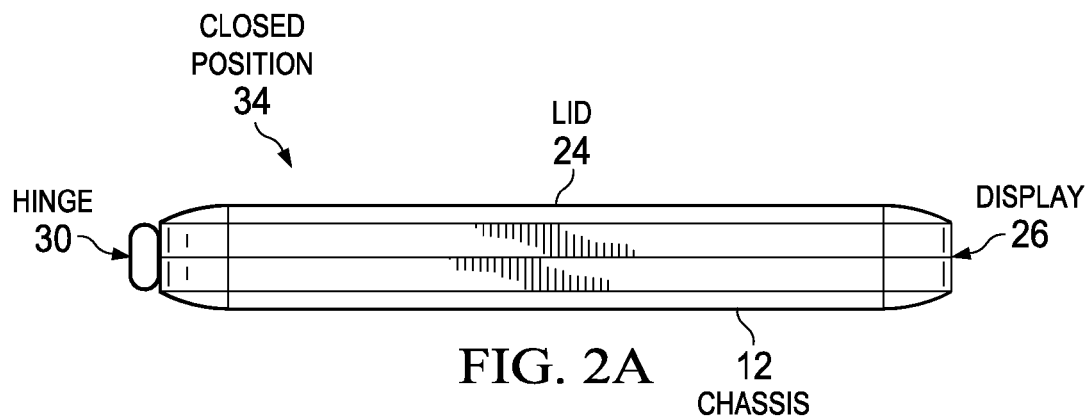
FIGS. 2A-2C depict a side view of a convertible portable information handling system in a closed position, open position, and tablet position.
Figure 2C:
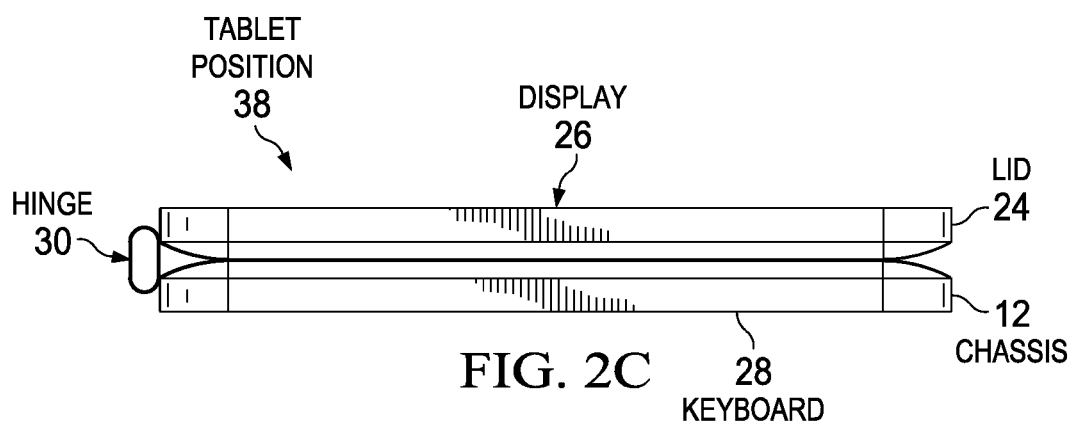
Figure 2B:
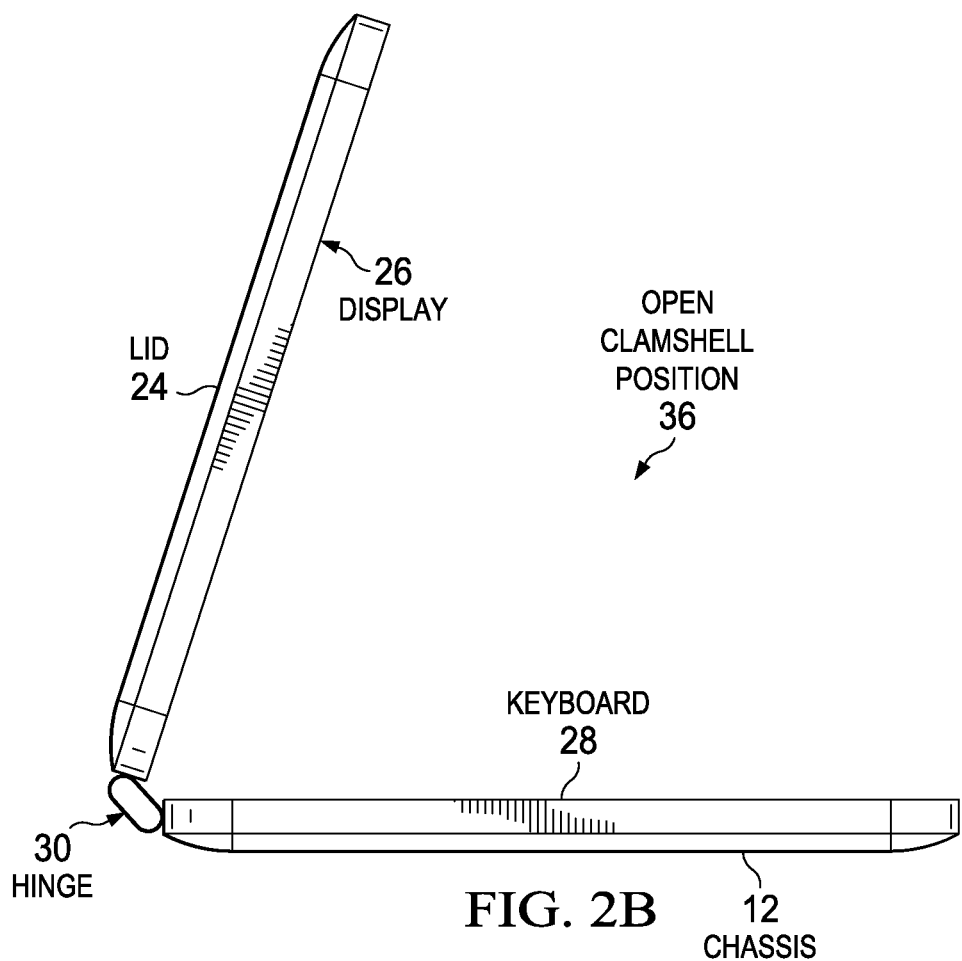

Referring now to FIGS. 2A-2C, a side view depicts a convertible portable information handling system 10 in a closed position 34, open position 36, and tablet position 38. In closed position 34, lid 24 rests parallel and proximate to chassis 12 to enclose display 26. In open clamshell position 36, lid 24 rotates approximately 90 degrees to expose display 26 and keyboard 28 for use by an end user. In tablet position 38, lid 24 rotates substantially 360 degrees to rest proximate and parallel to chassis 12 with display 26 exposed at the upper surface and keyboard 28 exposed at the lower surface. The example embodiment depicts a rotational coupling of chassis 12 and lid 24 in which lid 24 move 360 degrees relative to chassis 12, however, in alternative embodiments, hinge 30 can rotate lid 24 and chassis 12 relative to each other in alternative manners to obtain closed, open and tablet positions, such as by rotating lid 24 about a vertical axis.

Figure 3:
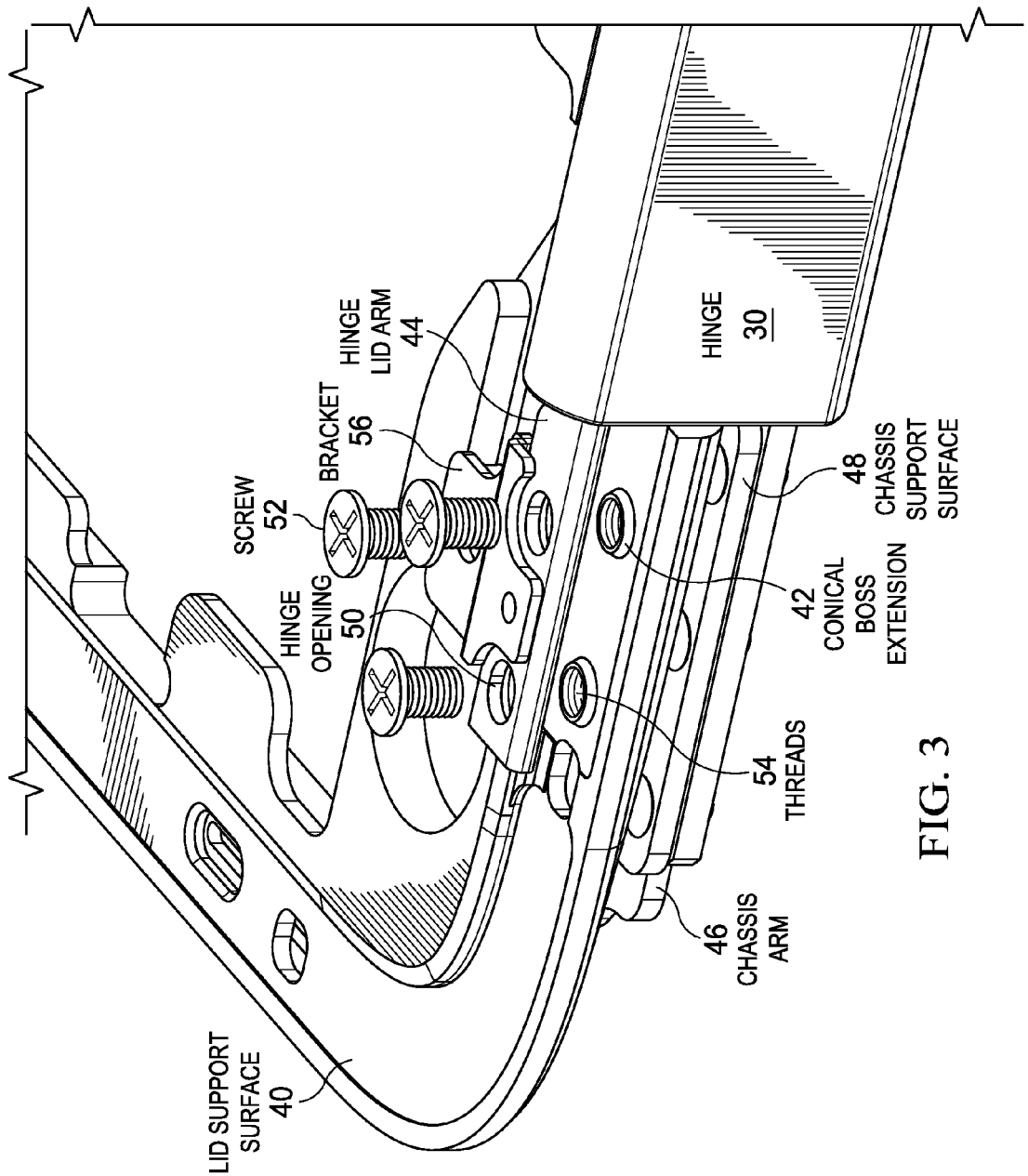
FIG. 3 depicts a blow-up upper perspective view of a hinge axis coupling arrangement with a lid support surface having a conical boss extension that fits in a hinge countersink.

Referring now to FIG. 3, a blow-up upper perspective view depicts a hinge axis coupling arrangement with a lid support surface 40 having a conical boss extension 42 that fits in a hinge countersink. Hinge 30 is a dual axis hinge having a hinge lid arm 44 that couples to lid support surface 40 and a chassis arm 46 that couples to a chassis support surface 48. A hinge opening 50 aligns with and fits over conical boss extension 42 so that a screw 52 fits through hinge opening 50 to engage threads 54 disposed along the interior surface of the opening defined within conical boss extension 42. Conical boss extensions 42 formed in lid support surface 40 aid in obtaining alignment of hinge lid arm 44 in the proper position during manufacture. A bracket 56 couples to hinge lid arm 44, such as by welding or other permanent affixing methods, to provide additional strength at the coupling of hinge lid arm 44 to lid support surface 40. Screws 52 have a length sufficient to fully engage threads 54 in conical boss extension 42 without adding extra height to the assembly. A more secure coupling of hinge lid arm 44 to lid support surface 40 is obtained by adding threads along the additional height provided by conical boss extension 42 over the upper surface of lid support surface 40. In the depicted embodiment, conical boss extension 44 raises the height of threads 54, however, in alternative embodiments other types of structures may be provided that increase the surface area of threads or other securing devices at lid support surface 40, such as to engage clips or other types of coupling devices inserted through hinge opening 50. In one alternative embodiment, the conical boss extension or other extension structure may be placed in hinge lid arm 44 to accept a coupling device inserted from an opening in lid support surface 40 to engage threads in hinge lid arm 44. Although conical boss extension 42 is depicted in lid support surface 40 but not chassis support surface 48, in one embodiment the same type of conical boss extension structure or other types of extension structures may be used in both lid support surface 40 and chassis support surface 48.

Figure 4:
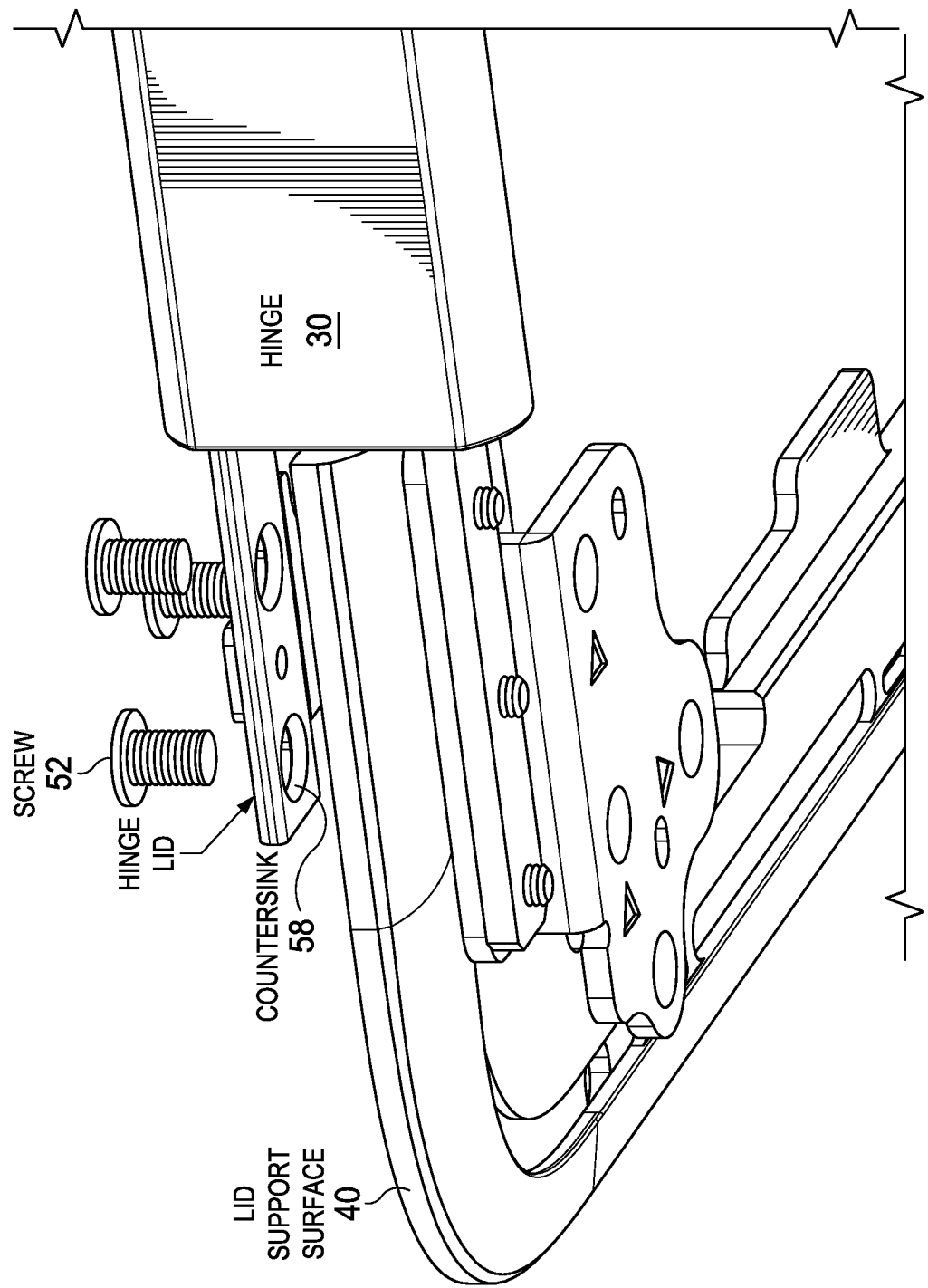
FIG. 4 depicts a blow-up lower perspective view of a hinge axis coupling arrangement with a countersink to engage a lid support surface conical boss extension.

Referring now to FIG. 4, a blow-up lower perspective view depicts a hinge axis coupling arrangement with a countersink 58 to engage a lid support surface 40 conical boss extension. Countersink 58 enlarges hinge opening 50 next to lid support surface 40 and gradually tapers to a smaller diameter as the distance in opening 50 increases from lid support surface 40 until opening 50 has a diameter to snugly fit screw 52. The tapering of countersink 58 matches the tapering of conical boss extension 42 so that hinge 30 is held firmly in place when screws 52 fully engage threads 54 of conical boss extension 42. In alternative embodiments, other shapes of extensions 42 may extend upward into matching shaped openings formed in hinge lid arm 44, such as a square extension that has a round opening with threads to accept a screw.

Figure 5:
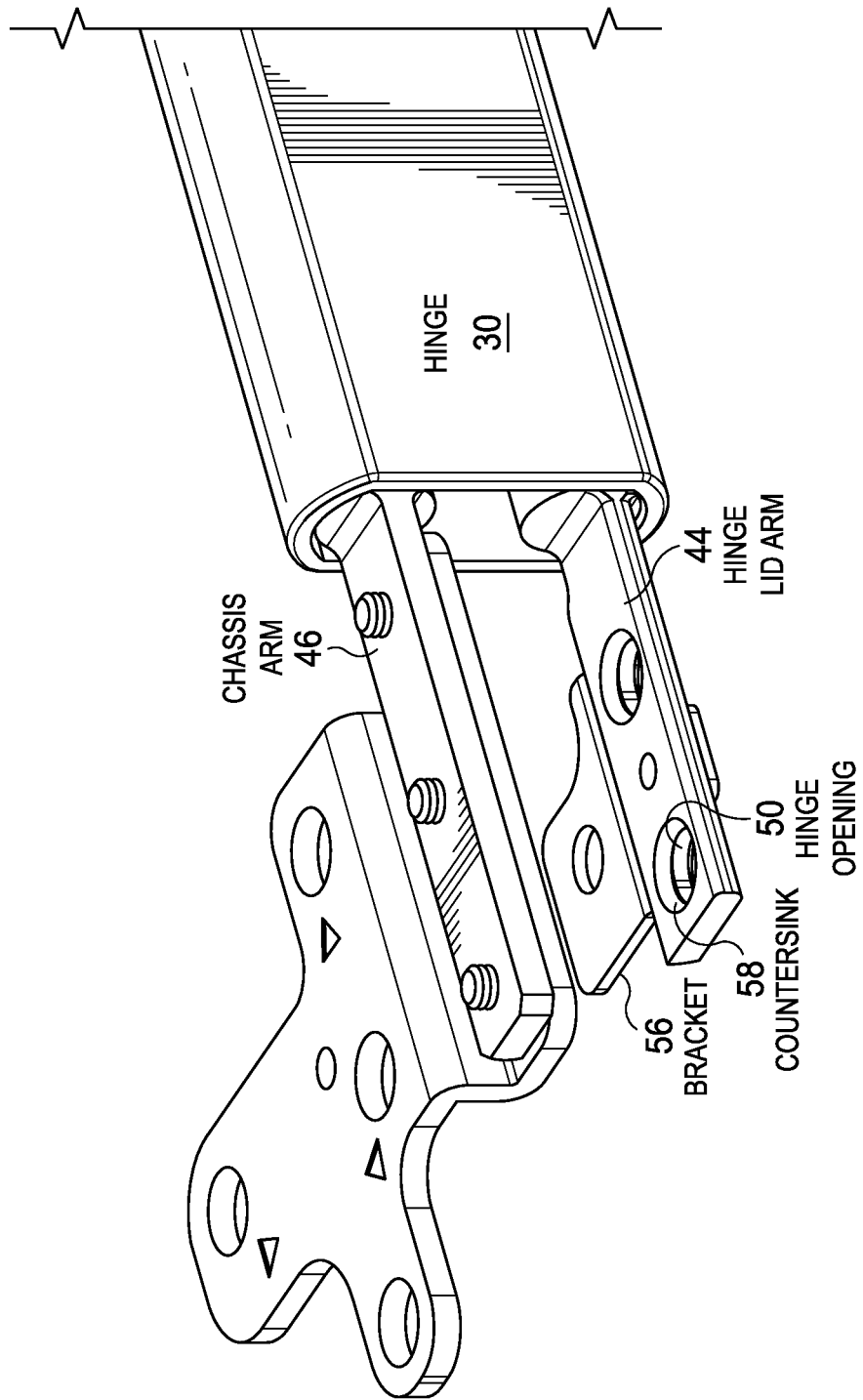
FIG. 5 depicts a side perspective view of a dual axis hinge having coupling arms with countersinks to accept a support surface conical boss.

Referring now to FIG. 5, a side perspective view depicts a dual axis hinge 30 having coupling arms 44 and 46 with countersinks 58 to accept a support surface conical boss. Countersinks 58 in hinge openings 50 mate with conical boss extensions on the support surface of the lid so that increased strength is available at hinge arm 44 without thinning hinge arm 44 or removing excess material. Thickness available along the inner surface of the conical boss allows for more thread engagement with coupling screws to help prevent thread stripping or failure. In addition, a riveted or welded bracket 56 provides an additional mounting opening 50 to accept an additional coupling screw without compromising hinge arm height constraints.

Figure 6:
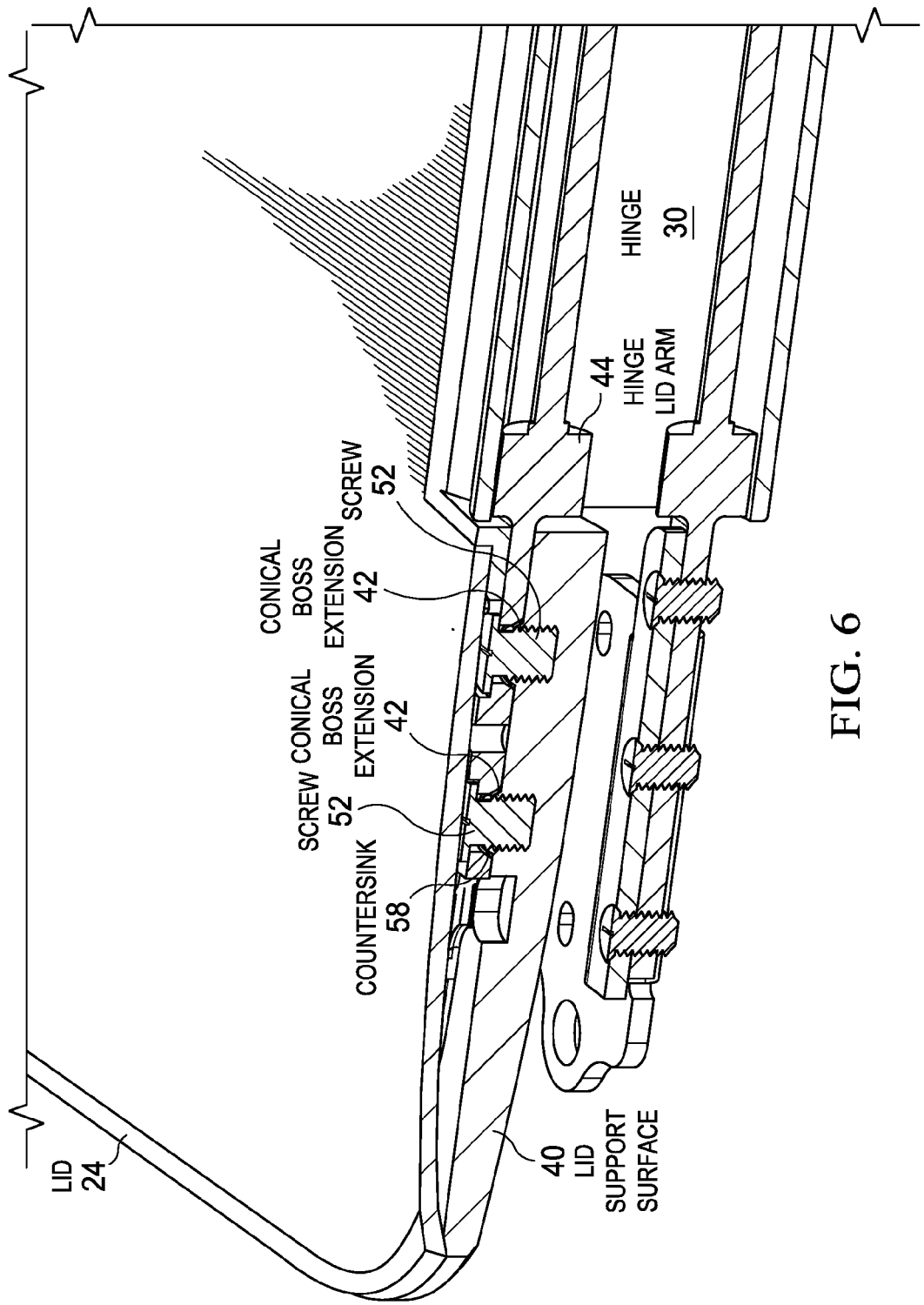
FIG. 6 depicts a side perspective cutaway view of an information handling system in a closed position with a lid support surface conical boss extension engaged in a hinge countersink.

Referring now to FIG. 6, a side perspective cutaway view depicts an information handling system 10 in a closed position with a lid support surface 40 conical boss extension 42 engaged in a hinge 30 countersink 58. In the example embodiment, screws 52 engage threads within conical boss extension 42 to pull hinge lid arm 44 securely against lid support surface 40. Hinge lid arm 44 is prevented from sliding laterally across lid support surface 44 by matching engagement of conical boss extension 42 and countersink 58.

Figure 7:
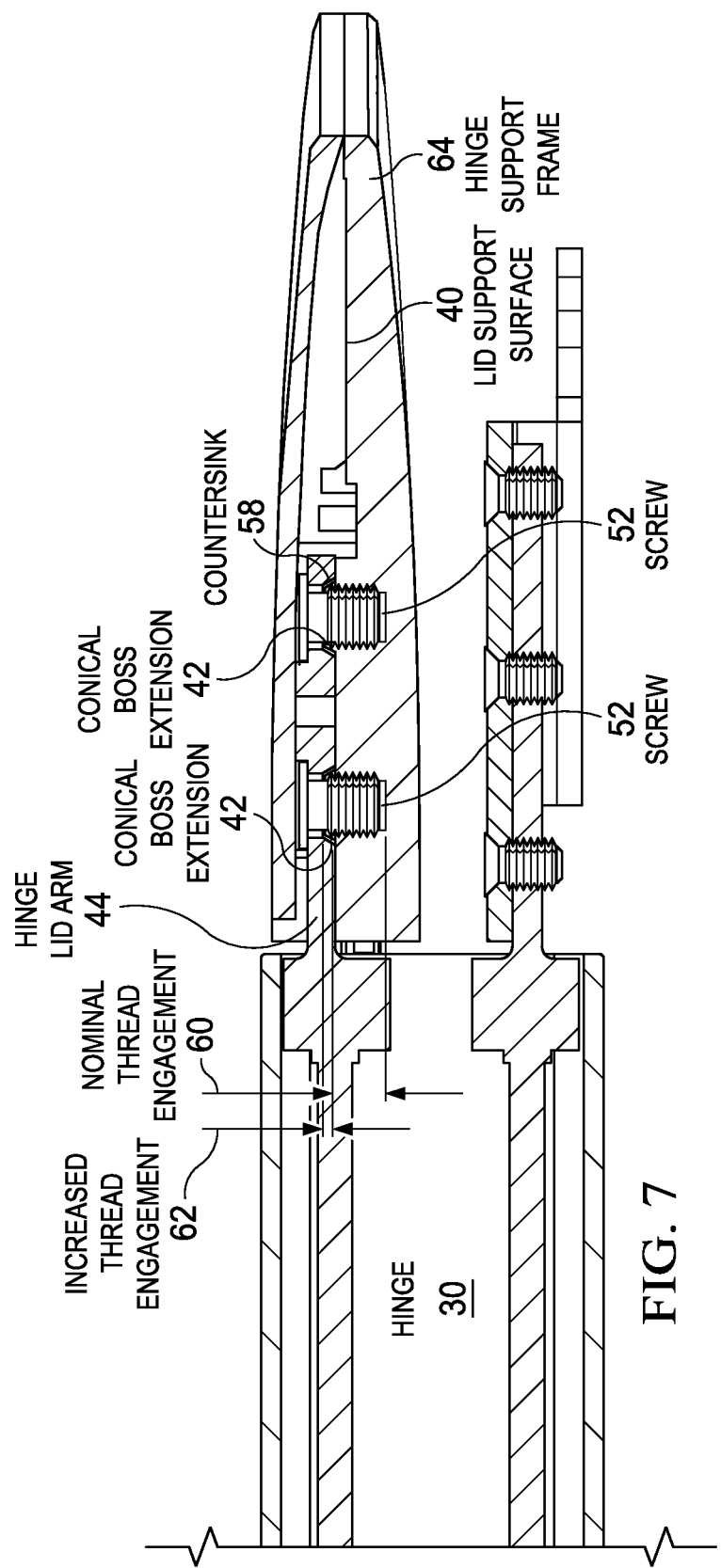
FIG. 7 depicts a side cutaway view of an information handling system in a closed position with a lid support surface conical boss extension engaged in a hinge countersink.

Referring now to FIG. 7, a side cutaway view depicts an information handling system 10 in a closed position with a lid support surface 40 conical boss extension 42 engaged in a hinge countersink 58. The thickness of lid 24 hinge support frame 64 at support surface 40 is depicted with a nominal thread engagement 60, which shows the height available for machining threads when no conical boss extension 42 is available, i.e., the thread space through the nominal height of support frame 64 without an extension above the nominal height, such as the conical boss extension described herein. By extending threads into conical boss extension 42 above lid support surface 40, an increased thread engagement 62 is created to provide a more secure coupling of hinge 30 to lid 24. In the example embodiment, the overall combined height of lid 24 and hinge lid arm 44 is reduced by using some of the thickness of hinge lid arm 44 to provide room for thread placement. In alternative embodiments, the amount of thread engagement may be increased or decreased by varying the degree to which an extension structure from lid support surface 40 protrudes into and even beyond and above hinge lid arm 44.

Although the present invention has been described in detail, it should be understood that various changes, substitutions and alterations can be made hereto without departing from the spirit and scope of the invention as defined by the appended claims.

What is claimed is:

1. An information handling system comprising:
a chassis having a hinge support frame;
a lid having a hinge support frame;
processing components disposed in the chassis and operable to cooperate to process information;
a display disposed in the lid and interfaced with the processing components, the display operable to present information as visual images;
a hinge coupled to the chassis hinge support frame and the lid hinge support frame by one or more coupling devices, the hinge rotationally coupling the chassis and lid to each other;
wherein the lid support frame has a conical boss extending into a countersink of the hinge at the coupling device.

2. The information handling system of claim 1 wherein the conical boss and countersink have a circular inner surface into which the coupling device inserts.

3. The information handling system of claim 2 wherein the coupling device comprises a screw that engages threads formed in the conical boss circular inner surface, the threads and conical boss extending past a nominal surface of the support frame.

4. The information handling system of claim 1 further comprising a bracket bonded to the hinge, the bracket including an opening aligned to a coupling location in the support frame.

5. The information handling system of claim 1 wherein the hinge comprises a dual axis hinge operable to rotate the lid 360 degrees relative to the chassis.

6. The information handling system of claim 1 wherein the hinge comprises a single axis hinge operable to rotate the lid less than 180 degrees relative to the chassis.

7. The information handling system of claim 1 wherein the chassis support frame has a conical boss extending into a counter sink of the hinge at the coupling device.

8. The information handling system of claim 7 wherein the conical boss includes threads to accept a screw coupling device.

9. A method for coupling a hinge to an information handling system, the method comprising:
forming an opening in the hinge to accept a coupling device;
forming a countersink in the hinge opening;
forming an opening in the information handling system to accept the coupling device, the opening having a securing device for engaging the coupling device;
forming an extension integrated with the information handling system proximate the opening and sized to fit into the countersink, the extension including the securing device for engaging the coupling device; and
inserting the coupling device into the hinge opening then into the extension and then into the information handling system opening, the coupling device engaging the securing device to couple the hinge to the information handling system.

10. The method of claim 9 wherein the information handling system comprises a chassis and a lid, the hinge rotationally coupling the chassis to the lid, and wherein the information handling system opening comprises an opening in the lid to couple the lid to the hinge.

11. The method of claim 10 further comprising:
forming a second opening in the hinge to accept a second coupling device;
forming a countersink in the second opening;
forming an opening in the information handling system chassis to accept the second coupling device, the opening having a securing device for engaging the coupling device;
forming an extension integrated with the information handling system chassis proximate the opening and sized to fit into the countersink, the extension including the securing device for engaging the coupling device; and
inserting the second coupling device into the second hinge opening then into the extension and then into the information handling system chassis opening, the second coupling device engaging the securing device to couple the hinge to the information handling system chassis.

12. The method of claim 11 wherein the hinge comprises a dual axis hinge operable to rotate the lid substantially 360 degrees relative to the chassis.

13. The method of claim 9 wherein the coupling device comprises a screw and the securing device comprises threads engaged by the screw.

14. The method of claim 9 wherein the extension comprises a conical boss.

15. The method of claim 9 further comprising affixing a bracket to the hinge proximate the opening, the bracket extending from the hinge and having an opening for accepting a coupling device aligned to engage the information handling system in a position offset from the hinge.

16. A system for rotationally coupling an information handling system chassis and lid, the system comprising:
   a dual axis hinge having first and second arms, the first arm having a coupling device opening;
   a lid securing surface proportioned to rest against the first arm and having a coupling device opening aligned with the with first arm coupling device opening;
   an extension disposed at the lid securing surface opening to extend into the first arm coupling device opening when the lid securing surface rests against the first arm; and
   a coupling device inserted from the first arm coupling device opening into the lid securing surface coupling device opening to engage with the extension for securing the lid to the hinge first arm.

17. The system of claim 16 wherein the extension comprises a conical boss and the first arm coupling device opening comprises a countersink sized to accept the conical boss.

18. The system of claim 16 further comprising threads formed in the extension and operable to engage a screw coupling device inserted into the extension.

19. The system of claim 16 further comprising a bracket coupled to the first arm and having an opening offset from the first hinge arm and aligned with an opening in the lid for accepting a coupling device.

20. The system of claim 16 further comprising a chassis securing surface proportioned to rest against the second arm and having a coupling device opening aligned with a coupling device opening in the second arm, the chassis securing surface having an extension to extend into the second arm coupling device opening when the second hinge arm rests against the chassis securing surface.

\* \* \* \* \*